UNITED STATES PATENT OFFICE.

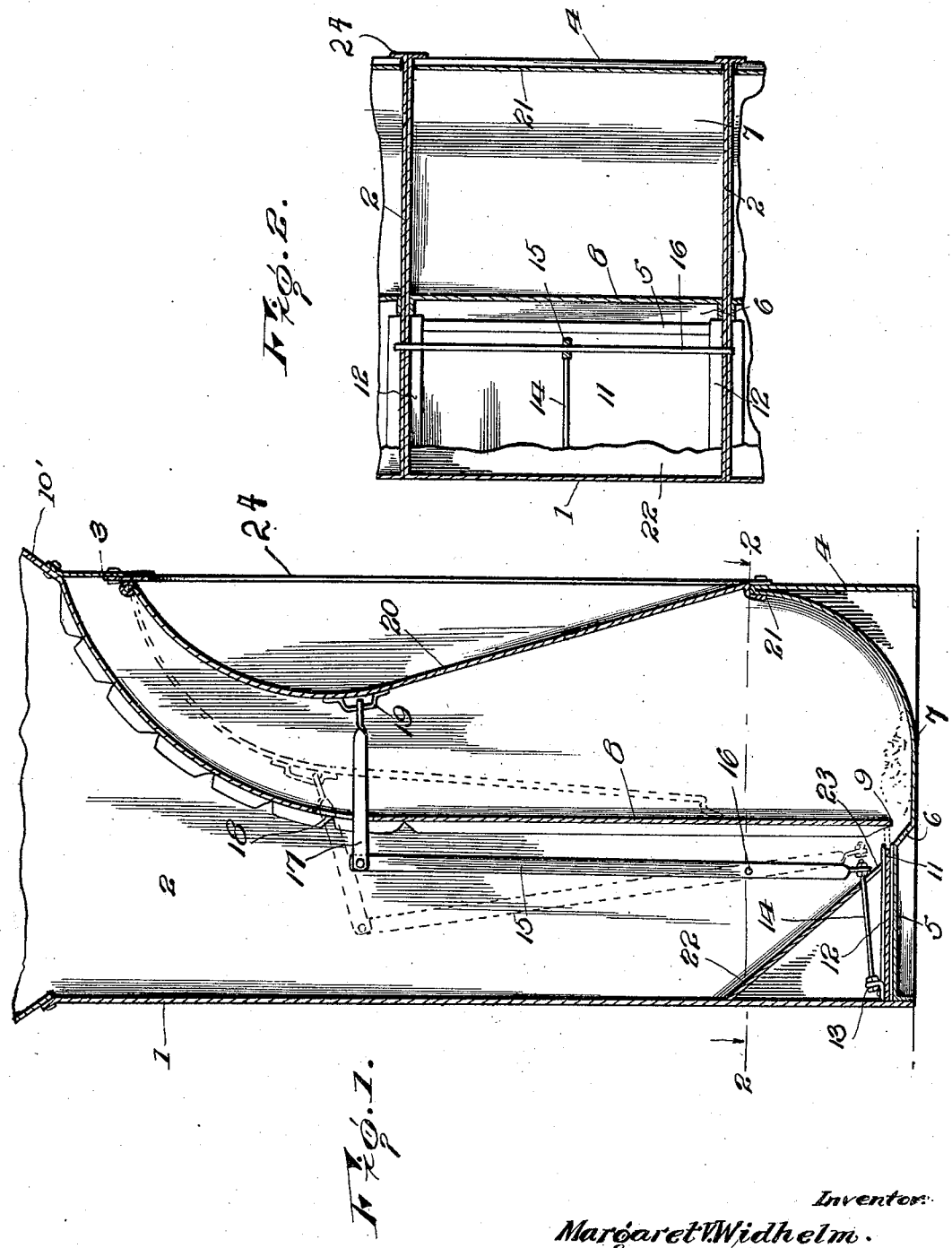

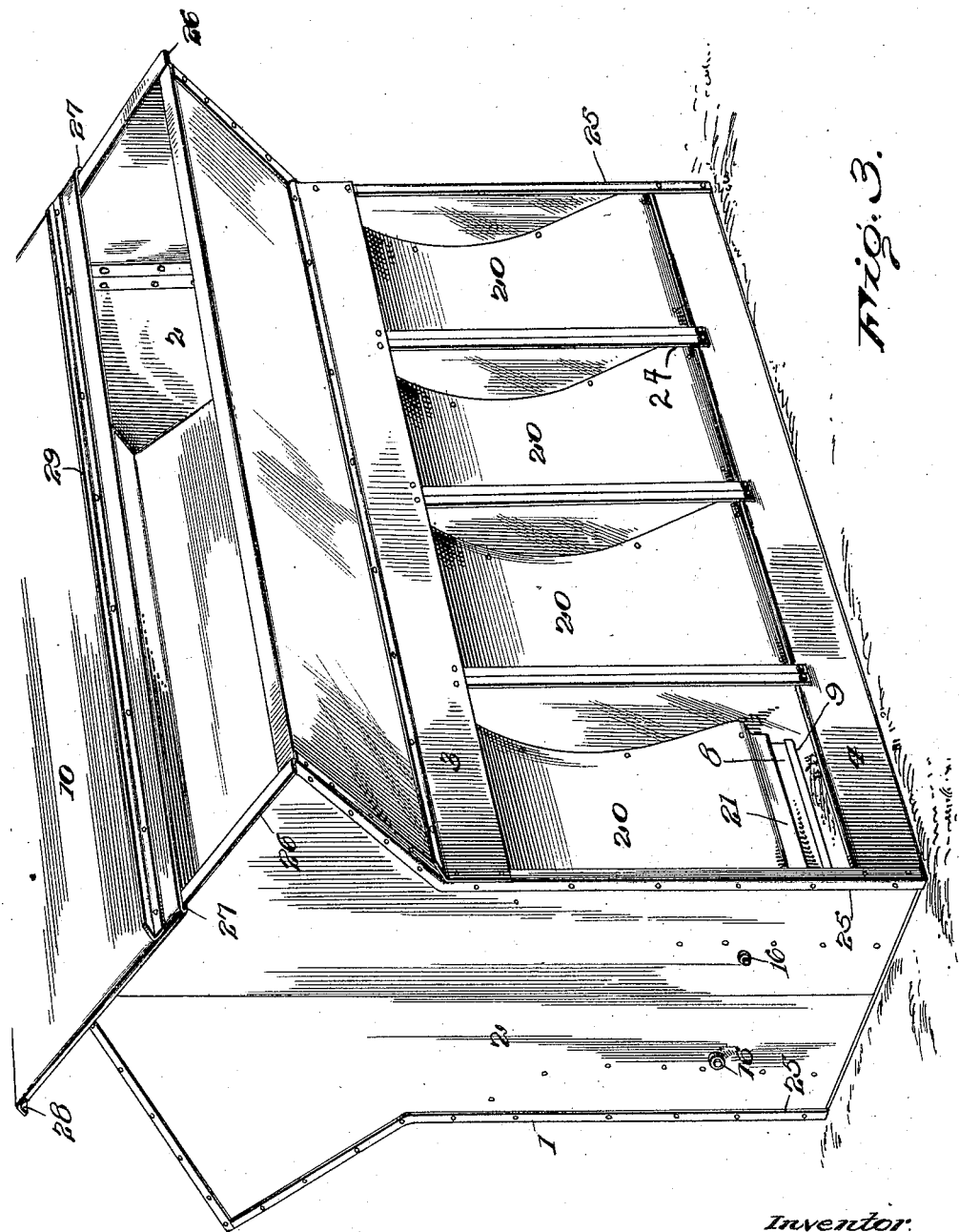

MARGARET V. WIDHELM, OF FREMONT, NEBRASKA.

FEED-RACK.

1,390,412.  Specification of Letters Patent.  Patented Sept. 13, 1921.

Application filed October 2, 1919. Serial No. 327,874.

*To all whom it may concern:*

Be it known that I, MARGARET V. WIDHELM, a citizen of the United States, residing at Fremont, in the county of Dodge and State of Nebraska, have invented certain new and useful Improvements in Feed-Racks, of which the following is a specification.

This invention relates to feeding racks for live stock and seeks to provide a feeding rack or hopper from which the animal may readily feed and which will be provided with means to prevent waste of the food. An object of the invention is to provide a guard or door which will normally cover the opening provided for the feeding animal and which will be operated by the animal to automatically cut off and establish a flow of feed into the feeding trough or receptacle. A further object of the invention is to provide a construction which will control the amount of feed rendered accessible to the animal at any time and also to provide means which will prevent flow of the feed while the animal is eating.

The invention is illustrated in the accompanying drawings, in which—

Figure 1 is a vertical section of a feed rack or hopper embodying my improvements;

Fig. 2 is a horizontal section on the line 2—2 of Fig. 1;

Fig. 3 is a perspective view, showing a larger form of the invention.

In carrying out the invention, I employ a hopper or bin consisting, as shown in Fig. 1, of a back wall 1 and side walls 2, the side walls being connected by cross strips 3 and 4 at their upper and lower ends whereby an opening is provided in the front of the bin or hopper through which the feeding animal may insert his head. The bottom of the hopper is constructed of a plate of sheet metal or similar material having a rear portion 5 extending between the side walls 2 and abutting the back wall 1, said rear portion 5 being disposed above the extreme lower edges of the back and side walls, as clearly shown. At the front edge of the rear portion 5 is a downwardly and forwardly inclined wall 6 which constitutes a slide down which the feed may pass to rest upon the front portion 7 of the bottom which constitutes a feeding trough, said portion 7 being extended upwardly and forwardly and terminating at the upper edge of the lower cross strip 4, as clearly shown in Fig. 1. A partition 8 is disposed between the side walls 2 of the bin or hopper and the lower edge 9 of this partition is spaced from the bottom of the device and also from the slide portion 6 of the same so that an opening is provided in rear of and below the partition through which the feed may pass into the feeding trough. The upper portion of the partition is curved forwardly and meets the cross strip 3 so that a large space is provided between the partition, the back wall and the side walls to contain the feed. The feed is, of course, placed in the bin through the top thereof which may be closed by a lid or cover 10 of any convenient form, the portion of the bin or hopper above the partition being flared, as shown at 10', to facilitate the admission of the feed.

A sliding valve or cut-off 11 is supported on the rear portion 5 of the bottom of the bin and this valve may be fitted in guides 12, as shown. On the upper side of the valve adjacent the rear edge thereof is a lug 13 in which is secured one end of a link 14, the front end of said link being attached to the lower end of a lever 15 which is fulcrumed upon a cross rod 16 disposed in the lower portion of the bin and secured in and extending between the side walls 2. The upper end of the lever 15 is pivoted to the inner or rear end of a push bar 17 which extends through a slot 18 in the partition 8 and has its front end engaged in an eye 19 on the inner or rear side of a swinging door or guard 20. The said door or guard 20 is pivotally supported at its upper end adjacent the cross strip 3 and at its lower end is provided with a stop lip 21 adapted to impinge against the trough portion 7 of the bottom of the device and thereby be prevented from swinging through the feeding opening. An inclined deflecting plate 22 is secured between the lower portion of the side walls 2 and extends from the back wall 1 to the shelf or elevated rear portion 5 of the bottom of the device so as to prevent the feed accumulating at the back of the bin and checking the operation of the working parts. The lower edge of the deflector 22 is provided with a notch or slot 23 through which the link 14 plays as will be readily understood.

It will be noted that the guard or door 20 is arcuate in form so that it will be heavier than a straight door of dimensions sufficient to cover the feeding opening. The door will, therefore, positively swing toward the front of the device and will cover the feeding opening so that it must be operated by the feeding animal. In the normal position of the parts, as shown in full lines in Fig. 1, the door is in closed position and the push bar 17 will be brought forward so that the lever 15 will hold the slide or cut-off at the rear limit of its movement. In this position of the parts, sufficient feed may flow into the trough to cover the opening or space below the partition 8. When an animal desires to feed he will push against the door or guard 20 and will thereby move the parts to the position shown in dotted lines so that the cut-off or valve will be brought forward and abut the partition and thereby cut-off further flow of the feed. The animal may then consume all the feed which may be in the trough 7 but cannot get more than said amount so that over-feeding and waste of the food will be prevented. After feeding, the animal will, of course, withdraw his head and the guard 20 will swing to the closed position thereby returning the valve to its initial rear position and permitting a further supply of feed to flow into the trough and the feed can only flow until the space below the partition has been covered.

As shown in Fig. 2 and as will be readily understood, the invention is not limited to a single bin but a row of bins may be constructed side by side, the fulcruming rod 16 extending through the entire row of bins. The side walls of the bins may be constructed with lateral flanges 24 secured to the strips 3 and 4 which will be common to all the bins in the row, the bins being thereby held together, in fixed relation. Moreover, as shown in Fig. 3, two rows of bins may be placed back to back and firmly secured together so that a large number of animals may be fed. The corners of the device may be reinforced and secured by angle bars 25 which will impart strength to the structure and prevent separation of the end walls from the parts connected therewith. Flanges or cleats 26 on the end walls at the upper edges of the same are slidably engaged by the grooved lips 27 on the lid 10, said lid being constructed with a stop lip 28 at its upper edge to engage the peak or ridge of the top and thereby prevent the lid sliding downwardly off the device. A rail 29 on the lid serves as a handle whereby it may be opened.

The device is exceedingly simple in its construction and is positive and efficient in its operation. By its use the animals will be plentifully fed but will be prevented from gormandizing so that they will be maintained in a healthy condition.

Having thus described the invention, what is claimed as new is:

1. A device for the purpose described comprising a bin having an opening in its front side and having an intermediate partition terminating near its bottom, a cut-off in rear of said partition and movable toward and from the same, a swinging guard normally covering the feeding opening, and operative connections between the said guard and the cut-off whereby flow of feed will be controlled.

2. A device for the purpose set forth comprising a bin having a feeding opening in its front side, an intermediate partition terminating short of the bottom of the bin, a shelf in the lower portion of the bin in rear of the partition, a valve slidably mounted on said shelf and movable toward and from the partition, a swinging guard mounted above the feeding opening and adapted to cover the same, and connections between said guard and the valve whereby flow of feed will be cut-off when the feeding opening is uncovered.

3. A device for the purpose set forth comprising a bin having a feeding opening in one side and having an intermediate partition terminating short of its bottom, a shelf in the lower portion of the bin in rear of said partition, an inclined deflector extending from the back of the bin to said shelf, a valve slidably mounted on said shelf and adapted to abut the partition, a swinging guard arranged to cover or uncover the feeding opening, and operative connections between said guard and the valve.

4. A device for the purpose set forth comprising a bin having a feeding opening in its front wall, a partition within the bin intermediate the front and back walls thereof, said partition being provided with a slot in its upper portion, a guard mounted for swinging movement above the feeding opening and adapted to cover and uncover the same, a vertically disposed lever pivoted within the bin in rear of the partition, a valve connected with the lower end of said lever, and a push bar extending through the slot in the partition and connecting the upper end of the lever with the guard.

5. A hog feeding bin having an upwardly inclined floor, a hopper discharging onto the upper portion of the floor, a sliding gate controlling the passage of feed from the hopper onto the floor, and a swinging door operatively connected to the gate and shifting the gate upon the movement of the door.

In testimony whereof I affix my signature.

MARGARET V. WIDHELM. [L. S.]